United States Patent
Young

(10) Patent No.: US 8,656,974 B2
(45) Date of Patent: Feb. 25, 2014

(54) ADJUSTABLE INNER TUBE

(75) Inventor: Allen C. Young, Capitola, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 1557 days.

(21) Appl. No.: 11/760,881

(22) Filed: Jun. 11, 2007

(65) Prior Publication Data

US 2008/0302458 A1    Dec. 11, 2008

(51) Int. Cl.
*B60C 5/04*    (2006.01)

(52) U.S. Cl.
USPC .......................... 152/511; 152/512; 156/118

(58) Field of Classification Search
USPC .............. 152/511, 512; 156/118, 122, 110.1; 29/894.31
See application file for complete search history.

(56) References Cited

U.S. PATENT DOCUMENTS

| | | | |
|---|---|---|---|
| 913,850 A | 3/1909 | Rees | |
| 1,245,524 A | 11/1917 | Stott et al. | |
| 1,248,045 A | 11/1917 | Wenzel, Jr. | |
| 1,263,176 A | 4/1918 | Wenzel, Jr. | |
| 1,317,976 A | 10/1919 | Hower | |
| 2,074,485 A * | 3/1937 | Nichols | 156/122 |
| 2,675,854 A * | 4/1954 | Engler | 156/122 |
| 2,913,035 A | 11/1959 | Lapin et al. | 152/415 |

FOREIGN PATENT DOCUMENTS

| | | | |
|---|---|---|---|
| DE | 10032300 A1 * | 1/2002 | |
| EP | 260684 A2 * | 3/1988 | |
| JP | 55-44832 A * | 3/1980 | |
| JP | 01304930 A * | 12/1989 | |

* cited by examiner

*Primary Examiner* — Geoffrey L Knable
(74) *Attorney, Agent, or Firm* — Booth Udall Fuller, PLC

(57) ABSTRACT

An adjustable inner tube for a pneumatic tire includes a valve and a continuous tube. The continuous tube includes a first segment and a second segment, wherein the first segment covers a portion of the second segment and the second segment may slide relative to the first segment to alter the circumference of the tube.

7 Claims, 2 Drawing Sheets

ADJUSTABLE INNER TUBE

TECHNICAL FIELD

This invention relates generally to the field of pneumatic tires and more particularly to an adjustable inner tube.

BACKGROUND

Pneumatic tires are commonly used in vehicles such as automobiles, motorcycles, wheel barrels, and bicycles. Such tires are inflated with air and serve to provide a cushion between a vehicle and the ground thereby absorbing shock from surface irregularities. Some pneumatic tires utilize an inner tube which holds compressed air and provides the tire with its shape. The inner tube is usually a torus shaped balloon with a fixed circumference. A fixed circumference is generally necessary because adequate cushioning requires that the tire maintain a consistent pressure. Thus, for example, a twenty eight inch diameter inner tube cannot be properly fitted to a twenty four inch diameter tire as uniform pressure will not be maintained around the tire. Accordingly, replacing an inner tube for a pneumatic tire necessitates a specific inner tube manufactured with the same circumference as the tire.

SUMMARY OF THE DISCLOSURE

The present invention provides an adjustable inner tube for a pneumatic tire which substantially eliminates or greatly reduces at least some of the disadvantages and problems associated with previous inner tubes.

In accordance with a particular embodiment, an adjustable inner tube for a pneumatic tire includes a valve and a continuous tube. The continuous tube includes a first segment and a second segment, wherein the first segment covers a portion of the second segment and the second segment may slide relative to the first segment to alter the circumference of the tube. In certain embodiments, the second segment has a smaller diameter relative to a diameter of the first segment. In a further embodiment, the adjustable inner tube may also include a bead positioned at an edge of the first segment and forms a collar around the continuous tube.

Certain embodiments of the invention may provide one or more technical advantages. A technical advantage of one embodiment is a one-size-fits-all inner tube which may be fitted to tires of various sizes. More particularly, the circumference of the tube may be adjusted to enable the inner tube to conform to the shape of tires having different circumferences. Accordingly, a user may not be required to measure or otherwise know at the time or purchase the size of the tire for which a replacement tube is needed. Further, vendors may reduce retail space allocated to inner tubes as stocking specific inner tubes that correspond to a specific tire size may be unnecessary.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

To provide a more complete understanding of the present invention and the features and advantages thereof, reference is made to the following description, taken in conjunction with the accompanying drawings in which.

DETAILED DESCRIPTION OF THE DRAWINGS

Figure 1A:
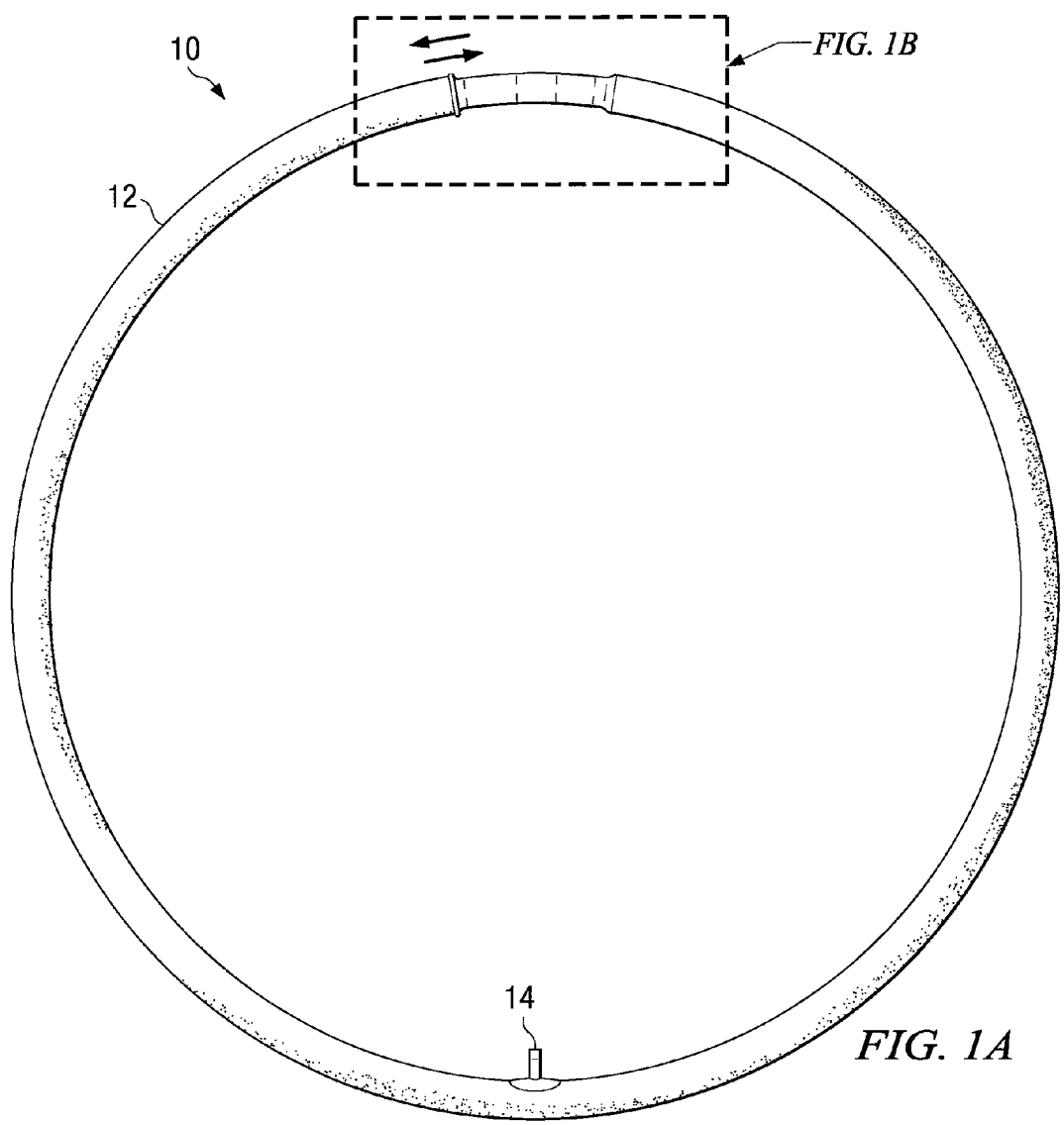
FIGS. 1(a) and 1(b) are drawings illustrating an adjustable inner tube for a pneumatic tire in accordance with a particular embodiment.
Figure 1B:
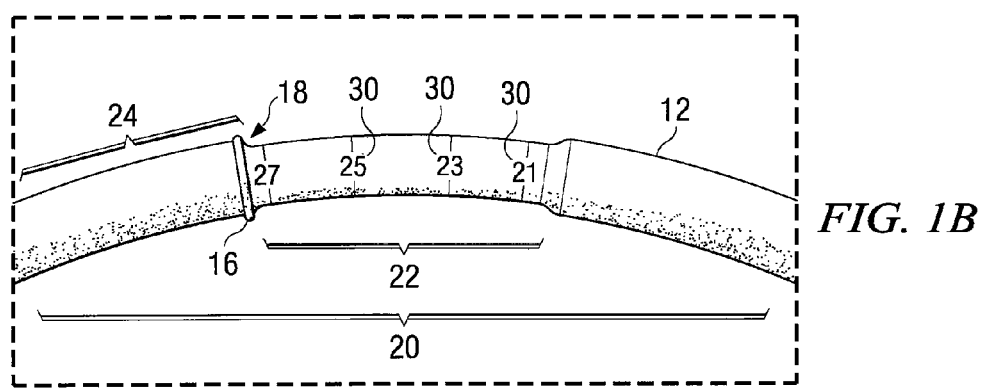

FIGS. 1(a) and 1(b) illustrate an adjustable inner tube 10 in accordance with a particular embodiment. Adjustable inner tube 10 may be an inner tube for a pneumatic tire as may customarily be used in vehicles such as bicycles. As illustrated, adjustable inner tube 10 includes tube 12, valve 14, and bead 16. In accordance with the teachings of certain embodiments, section 20 of adjustable inner tube 10 may be telescopic, thereby allowing for the circumference of adjustable inner tube 10 to vary. More particularly, section 20 may extend and/or retract in response to inflation. Such adjustments may occur automatically in response to inflation or may be performed manually by a user.

Tube 12 may be a continuous pressure-holding member that is substantially impermeable to the diffusion of air. Tube 12 may be fabricated of an elastomer such as rubber or other flexible material which may provide suitable cushioned support for a tire when inflated. As illustrated, tube 12 may be substantially torus shaped thereby allowing for it to conform to the shape of the tire and/or wheel rim when inflated. Inflation of tube 12 may be performed via valve 14.

Valve 14 may be a device which is operable to regulate the flow of air or other gasses in to and out of tube 12. Examples of valve 14 include a Schrader valve or Presta valve. While valve 14 is illustrated as protruding from tube 12, valve 14 may be positioned in any suitable manner.

Bead 16 may be a ring or collar formed around a section of tube 12. Bead 16 may facilitate the telescoping functionality of adjustable inner tube 10 by providing increased rigidity at adjustment point 18. Bead 16 may be fabricated of an elastomer or suitable plastic. In certain embodiments, bead 16 may be manufactured concurrently with tube 12. Alternatively, bead 12 may be manufactured separately and later attached using any suitable process. Various methods of manufacture will be described in greater detail below. It should be noted that certain embodiments of adjustable inner tube 10 may not have a bead 16.

Section 20 represents a collapsible portion of adjustable inner tube 10. In particular, section 20 may be a telescoping component that permits the circumference of adjustable inner tube 10 to increase or decrease when appropriate forces are applied thereto. In certain embodiments, a first section of section 20 (telescoping segment 22) may have a smaller diameter relative to a second section (sleeve segment 24). Such a design may facilitate the telescoping action by decreasing resistance between telescoping segment 22 and sleeve segment 24 when adjusting section 20. In alternate embodiments, section 20 may have a constant diameter throughout. In such embodiments, as described, bead 16 may assist in collapsing section 20 by forming a rigid barrier at adjustment point 18. Although telescoping segment 22 and sleeve segment 24 may be referred to as separate components, they may form a continuous portion of tube 12.

In the embodiment illustrated in FIG. 1(b), a portion of telescoping segment 22 has markings 30. Markings 30 serve to indicate the diameter and/or circumference of adjustable inner tube 10 when properly inflated. Thus, prior to inflation, a user may manually extend or shorten section 20 according to a marking 30 corresponding to the circumference of the tire to which adjustable inner tube 10 is to be fitted. In particular embodiments, an indicator mark may be placed on tube 12 at adjustment point 18. The indicator mark may be aligned with a marking 30 and thereby indicate the diameter and/or circumference to which adjustable inner tube 10 will inflate. After aligning the indicator mark with a marking 30, the inner tube may be fitted to the tire and inflated. After inflation, adjustable inner tube 10 may have a circumference which corresponds to the marking 30 to which telescoping segment 22 was adjusted.

Figure 2:
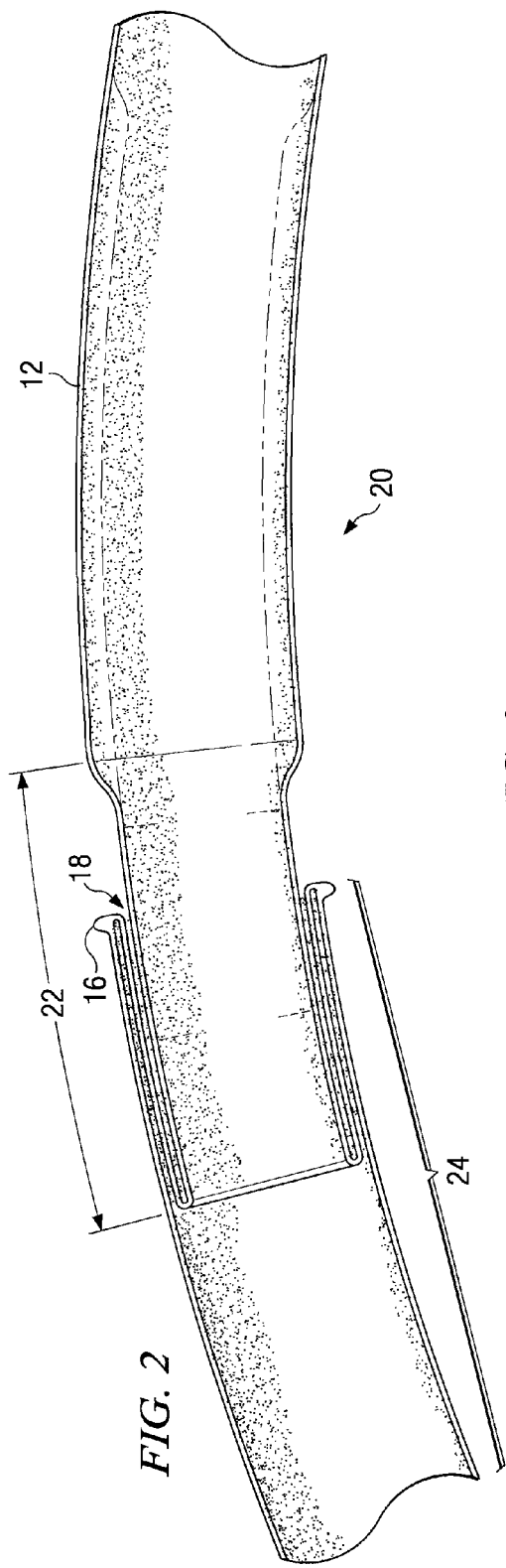
FIG. 2 is a drawing illustrating a cross-sectional view of a section of an adjustable inner tube for a pneumatic tire in accordance with a particular embodiment.

FIG. 2 illustrates a cross-section of section 20 of adjustable inner tube 10. In the illustrated embodiment, section 20 includes bead 16 and tube 12. Also illustrated are telescoping segment 22 and sleeve segment 24 which covers a portion of telescoping segment 22. Arrows are provided to indicate that telescoping segment 22 may slide relative to sleeve segment 24. In particular, all or a portion of telescoping segment 22 may be inserted or removed from sleeve segment 24 by pushing or pulling on the ends of section 20, respectively. Applying such forces may increase or decrease the circumference of adjustable inner tube 10. When fitted to a tire and inflated, section 20 may be adjusted by forces exerted due to increased air pressure and/or the tire. Thus, inflating adjustable inner tube 10 may automatically adjust section 20 such that adjustable inner tube 10 may be fitted to tires of various sizes. Additionally, as explained, adjustable inner tube 10 may be manually adjusted prior to inflation.

As indicated in FIG. 2, bead 16 may be positioned at the edge of sleeve segment 24 thereby forming adjustment point 18. Adjustment point 18 is the point where telescoping segment 22 is inserted into and removed from sleeve segment 24. Bead 16 may facilitate the insertion of telescoping segment 22 into sleeve segment 24 by providing increased rigidity at adjustment point 18. Thus, when the ends of section 20 are pushed together the increased rigidity may cause tube 12 to buckle at adjustment point 18 thereby allowing telescoping segment 22 to slide into sleeve segment 24. While an embodiment including bead 16 has been described in detail, certain embodiments may not have a bead 16.

To further illustrate the functionality of adjustable inner tube 10, the following example is provided wherein an inner tube for a pneumatic tire is replaced. Initially, section 20 may be extended or retracted such that the circumference of adjustable inner tube 10 matches that of the tire. Markings 30 along section 20 may be provided to assist the user in this process. Once the circumference of adjustable inner tube 10 is set, adjustable inner tube 10 may be installed in a process similar to that for any other standard inner tube. In particular, adjustable inner tube 10 may, in a substantially uninflated state, be inserted into a tire and the tire may be mounted to the rim or wheel of the vehicle. Next, adjustable inner tube 10 may be inflated with air via valve 14. In response to the air pressure, tube 12 may expand to conform to the dimensions of the tire. Because section 20 of adjustable inner tube 10 is extendable, the circumference of adjustable inner tube 10 may increase or decrease depending on the circumference of the tire. Such adjustment during inflation may not occur if the tire is properly user adjusted prior to inflation.

As mentioned, there are multiple methods for manufacturing adjustable inner tube 10. For example, adjustable inner tube 10 may be fabricated via a combined extrusion and blow molding process. According to this method of manufacture, an elastomer may be mixed and extruded thereby forming a tubular section. Next, a desired length of the tubular section may be cut and the ends may be connected and a valve may be attached. Subsequently, the tube may be blow molded in a heated mold which also cures the elastomer. In particular embodiments, the mold may have a reduced diameter section with a raised bead detail. While in the heating mold, air may be pumped into the tube causing the tube to form to the shape of the mold and thereby producing bead 16 and telescoping segment 22.

Adjustable inner tube 10 may also be manufactured by injection molding. According to this method of manufacture, rubber may be mixed and deposited into a tubular injection mold. As with the previous method, the die may or may not have a section having a reduced diameter and/or a raised detail portion for forming telescoping segment 22 and bead 16, respectively. The injection molding process may produce a linear tube whereby the ends may be cut and connected and a valve 14 may be attached, thereby forming adjustable inner tube 10. Adjustable inner tube 10 may then be placed into a heating mold to cure the rubber.

In accordance with another method of manufacture, bead 16 and tube 12 may be manufactured independently. The tube portion may be fabricated using either an extrusion or injection molding process as previously described. After the tube is fabricated, a pre-molded bead 16 may be slid around the tube and positioned in a desired location. Next, the ends of the tube may be connected and the tube may be placed into a heating mold for curing the rubber. The curing process may bond the bead 16 to the tube thereby forming adjustable inner tube 10.

With respect to the described manufacturing processes, various modifications, additions, or omissions may be made. Additionally, as discussed, in certain embodiments adjustable inner tube 10 may not have a bead 16. Additionally, telescoping segment 22 may not have a reduced diameter. Thus, the described manufacturing processes may be appropriately amended to yield multiple embodiments of an adjustable inner tube 10.

Figure 3:
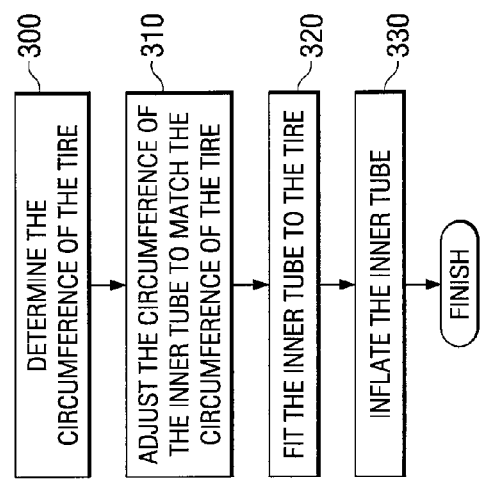
FIG. 3 is a flow chart illustrating a method for installing an adjustable inner tube for a pneumatic tire in accordance with a particular embodiment.

FIG. 3 illustrates a flowchart for installing an adjustable inner tube 10 in accordance with a particular embodiment. The described process begins at step 300 with the user determining the circumference of the tire or wheel rim for which adjustable inner tube 10 is to be installed.

Next, at step 310, the user may adjust section 20 of adjustable inner tube 10 such that the circumference of adjustable inner tube 10 substantially matches the circumference of the tire. This step may be performed using markings 30 that may be provided on section 20 to indicate the circumference of adjustable inner tube 10 when inflated. In particular, step 310 may be performed by aligning a mark on sleeve segment 24 with the marking 30 on telescoping segment 22 which corresponds to the desired circumference. In an embodiment, bead 16 may serve as the mark which is used for aligning sleeve segment 24 with markings 30. Additionally, adjustable inner tube 10 may be packaged so that telescoping segment 22 is pre-inserted into sleeve segment 24. Thus, adjustment may only require a user to pull telescoping segment 22 out from sleeve segment 24. Alternatively, adjustable inner tube 10 may come in an uninserted state wherein the user may have to push a portion of telescoping segment 22 into sleeve segment 24. It should be noted that while the user may perform this step manually, section 20 may automatically adjust to fit the tire during inflation.

At step 320 adjustable inner tube 10 may be fitted to the tire and mounted to the wheel rim. More specifically, adjustable inner tube 10 may be placed into the tire and the tire may then be installed around the rim of the wheel.

Once the tire is mounted to the wheel rim, adjustable inner tube 10 may, at step 330, be inflated. Inflation may occur via valve 14 and may be performed using any suitable air pump. In response to inflation, telescoping segment 22 may slide relative to sleeve segment 24, thereby adjusting to fit the dimensions of the tire. More particularly, if section 20 was not adjusted to match the circumference of the tire at step 310, then inflation may cause section 20 to adjust to properly fit the tire. Similarly, if section 20 was not properly adjusted at step 310, then inflating adjustable inner tube 10 may also cause section 20 to extend or retract to fit the tire.

Modifications, additions, or omissions may be made to the method depicted in FIG. 3. In certain embodiments, the method may include more, fewer, or other steps. For example, step 310 may be performed manually or automatically by the inflation process. Additionally, steps may be performed in any suitable order without departing from the scope of the invention.

While the present invention has been described in detail with reference to particular embodiments, numerous changes, substitutions, variations, alterations and modifications may be ascertained by those skilled in the art, and it is intended that the present invention encompass all such changes, substitutions, variations, alterations and modifications as falling within the spirit and scope of the appended claims.

What is claimed is:

1. An adjustable inner tube for a pneumatic tire, comprising:
   a valve; and
   an elastomer tube cured into a continuous annular shape enclosing a continuous annular chamber, the tube comprising:
      a first sleeve segment;
      a second telescoping segment coupled to the first sleeve segment at an intersection; and
      a bead forming a collar around the tube at the intersection of the first sleeve segment and the second telescoping segment, the bead having a higher rigidity than the first sleeve segment and the second telescoping segment to facilitate folding the second telescoping segment into the first sleeve segment;
   wherein the second telescoping segment is configured to fold into the first sleeve segment to adjust the circumference of the tube to one of a plurality of desired lengths while the first sleeve segment and the second telescoping segment maintain a continuous coupling at the intersection;
   wherein the second telescoping segment is configured to slide relative to the first sleeve segment to alter the circumference of the continuous annular tube in response to inflation; and
   wherein the second telescoping segment has a smaller diameter relative to a diameter of the first sleeve segment when the second telescoping segment is not folded into the first sleeve segment.

2. The adjustable inner tube of claim 1, further comprising a plurality of markings on the second telescoping segment, wherein each of the markings corresponds to a measurement associated with the adjustable inner tube when inflated.

3. The adjustable inner tube of claim 2, further comprising an indicator on the first sleeve segment, wherein aligning the indicator with a marking of the plurality of markings indicates the measurement associated with the adjustable inner tube when inflated.

4. The adjustable inner tube of claim 2, wherein the measurement is the circumference of the adjustable inner tube.

5. The adjustable inner tube of claim 2, wherein the measurement is the diameter of the adjustable inner tube when inflated.

6. The adjustable inner tube of claim 1, wherein sliding the second telescoping segment relative to the first sleeve segment comprises sliding the second telescoping segment into or out of the first segment.

7. A method for installing an adjustable inner tube, the method comprising:
   determining a circumference of a tire for which the adjustable inner tube is to be installed, the adjustable inner tube comprising:
      a valve; and
      an elastomer tube cured into a continuous annular shape enclosing a continuous annular chamber, the tube comprising:
         a first sleeve segment;
         a second telescoping segment coupled to the first sleeve segment at an intersection; and
         a bead forming a collar around the tube at the intersection of the first sleeve segment and the second telescoping segment, the bead having a higher rigidity than the first sleeve segment and the second telescoping segment to facilitate folding the second telescoping segment into the first sleeve segment;
      wherein the second telescoping segment is configured to fold into the first sleeve segment to adjust the circumference of the tube to one of a plurality of desired lengths while the first sleeve segment and the second telescoping segment maintain a continuous coupling at the intersection;
      wherein the second telescoping segment is configured to slide relative to the first sleeve segment to alter the circumference of the continuous annular tube in response to inflation; and
      wherein the second telescoping segment has a smaller diameter relative to a diameter of the first sleeve segment when the second telescoping segment is not folded into the first sleeve segment;
   adjusting the circumference of the adjustable inner tube, wherein adjusting the circumference of the adjustable inner tube comprises:
      folding the second telescoping segment of the adjustable inner tube into the first sleeve segment of the adjustable inner tube; and
      aligning an edge of the first sleeve segment with a marking on the second telescoping segment, the marking indicating a circumference of the adjustable inner tube; and
   inflating the adjustable inner tube.

* * * * *